March 4, 1941.  A. C. VELO  2,233,720
POWER TRANSMISSION MECHANISM
Filed May 31, 1932  6 Sheets-Sheet 1
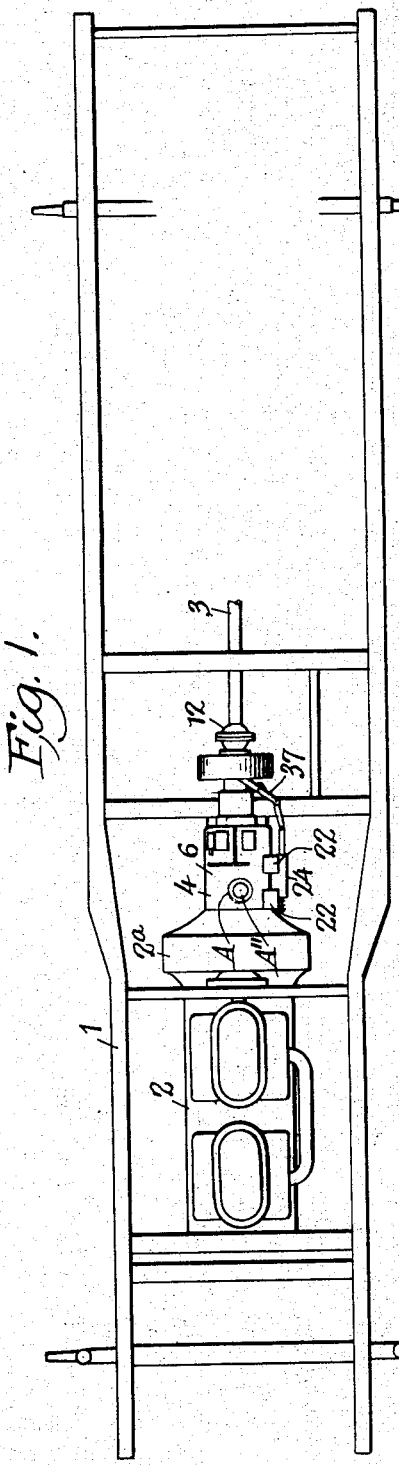
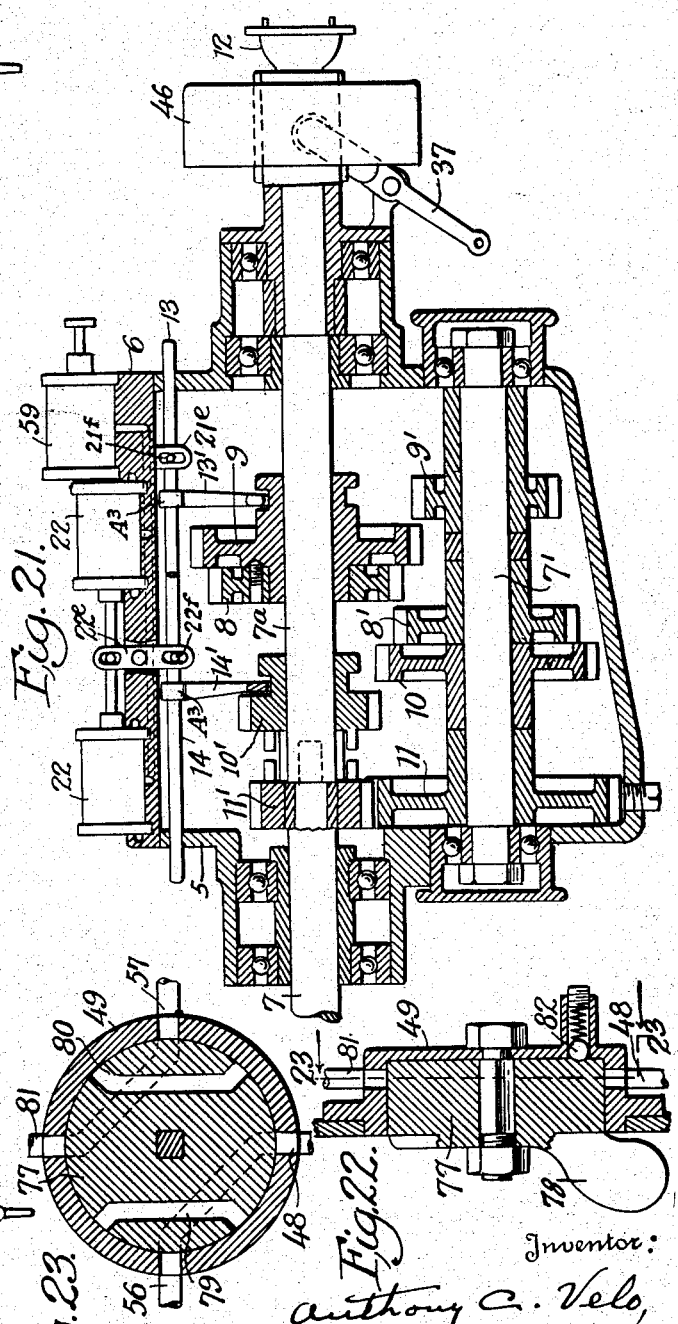
Inventor:
Anthony C. Velo,
By C. C. Hines
Attorney.

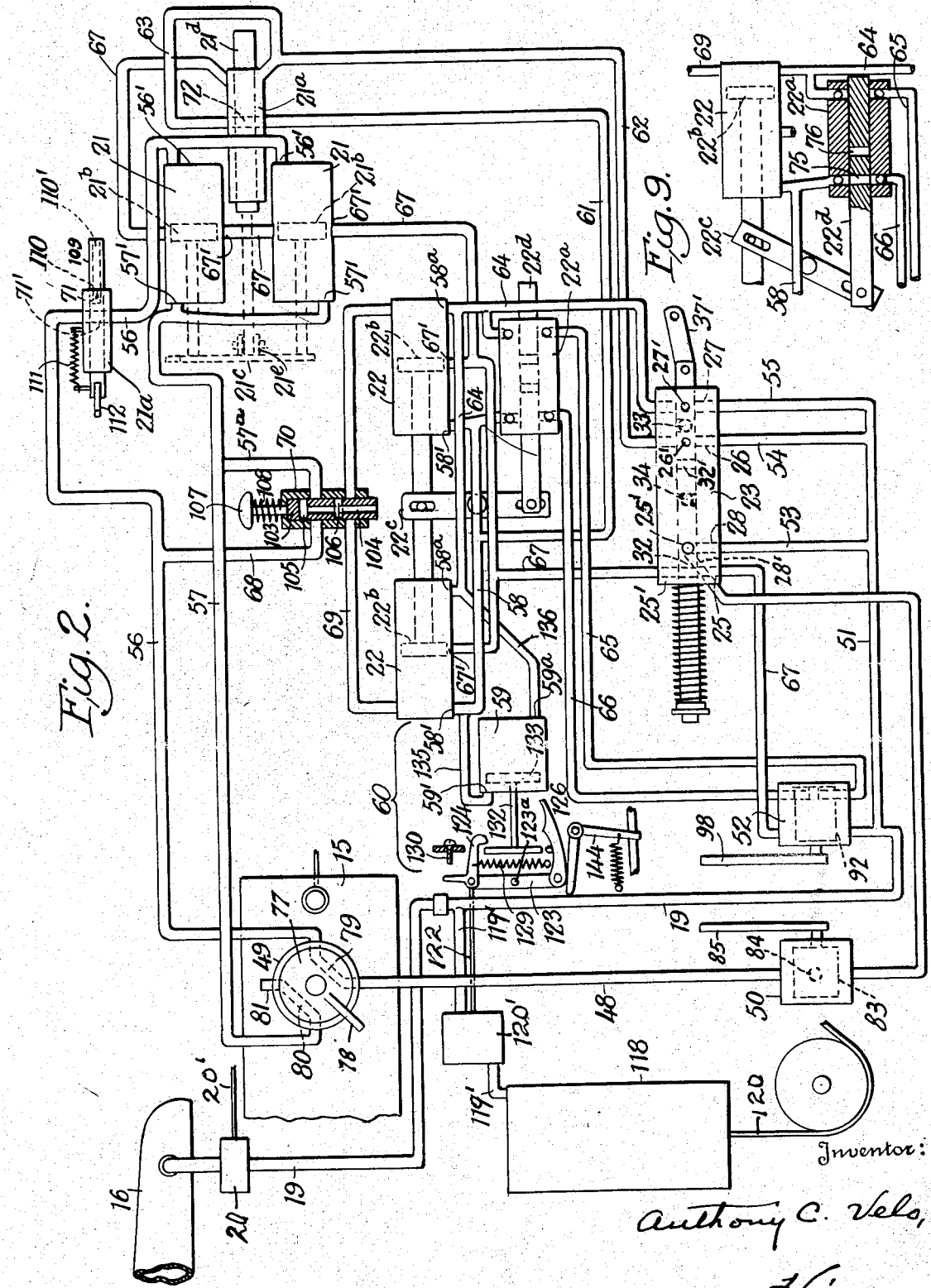

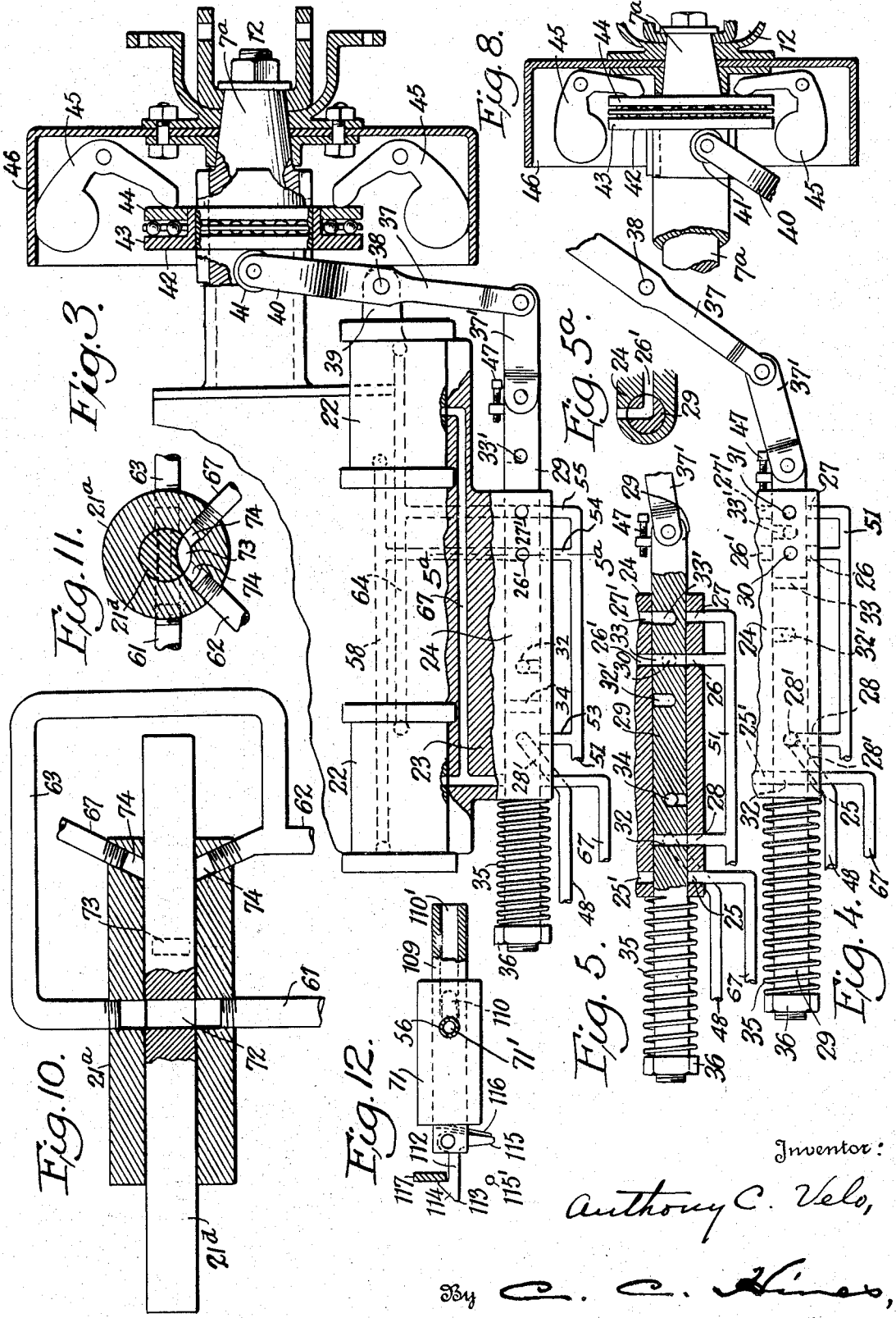

March 4, 1941.　　　A. C. VELO　　　2,233,720
POWER TRANSMISSION MECHANISM
Filed May 31, 1932　　　6 Sheets-Sheet 4
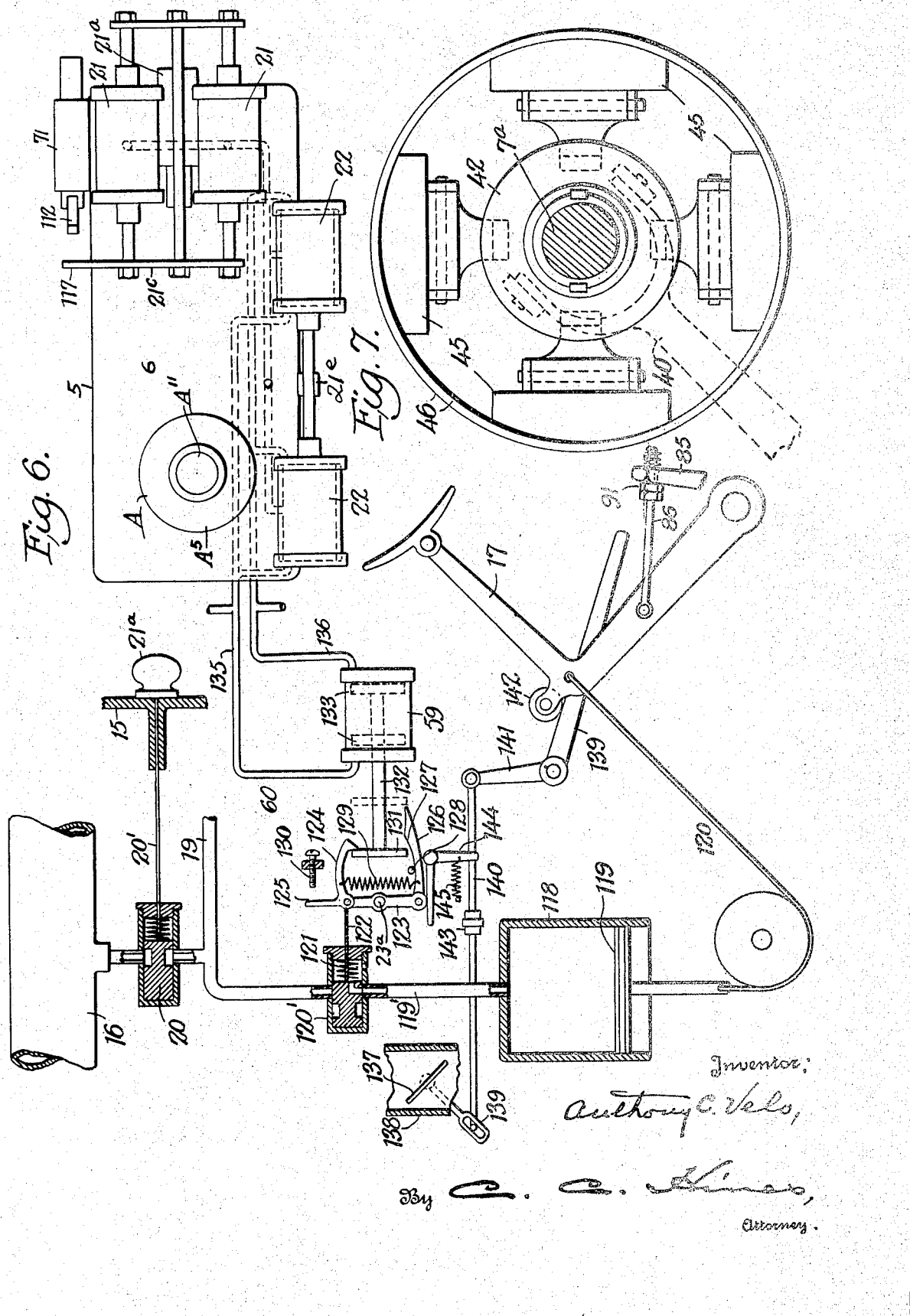

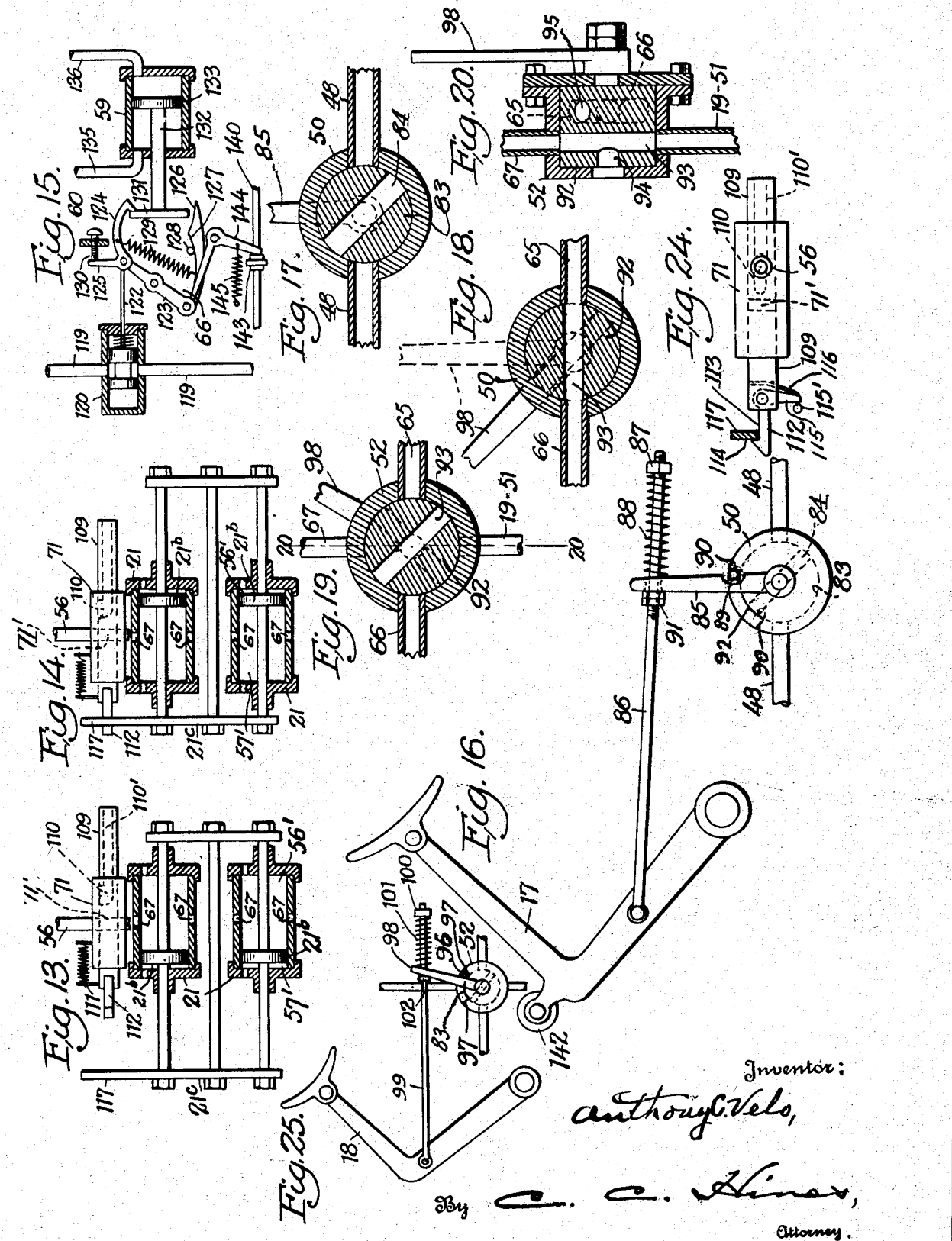

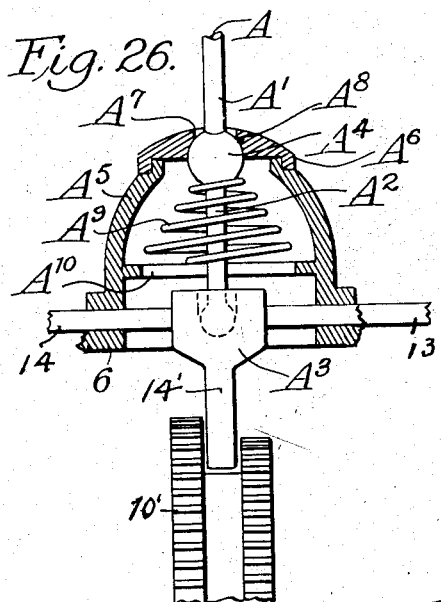
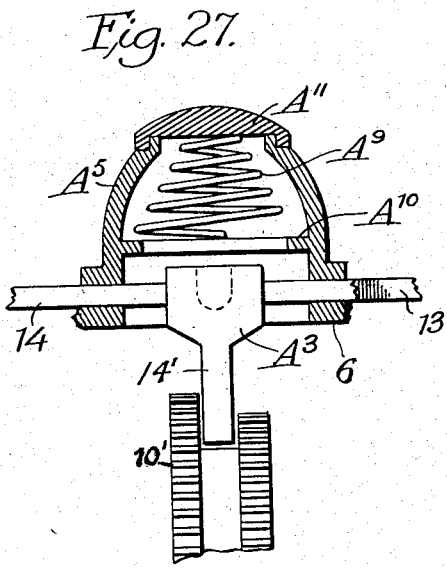
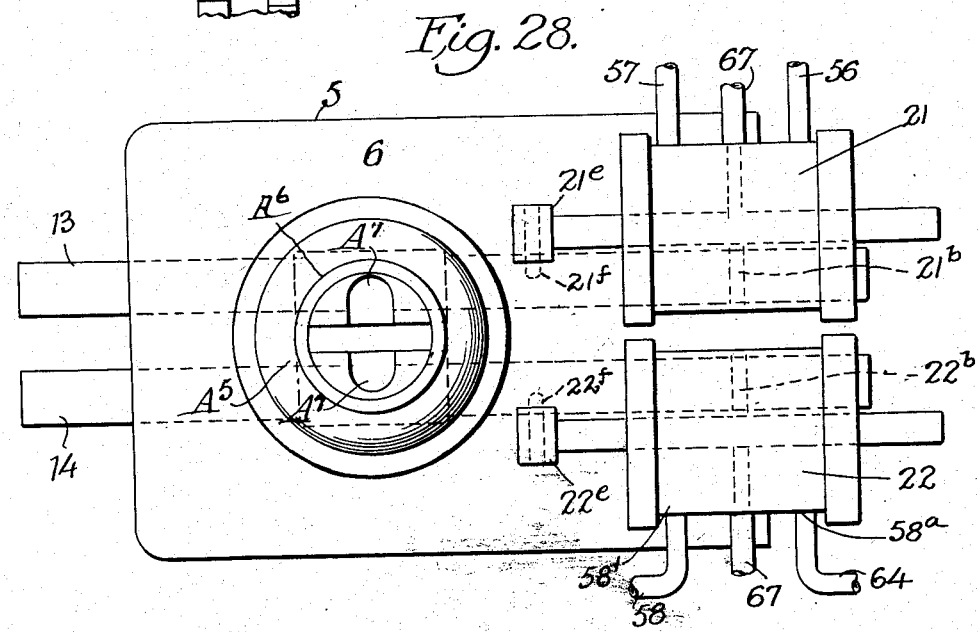

Patented Mar. 4, 1941

2,233,720

UNITED STATES PATENT OFFICE 2,233,720

POWER TRANSMISSION MECHANISM

Anthony C. Velo, New York, N. Y., assignor, by direct and mesne assignments, to Vaco Products, Inc., a corporation of Delaware Application May 31, 1932, Serial No. 614,573

53 Claims. (Cl. 192—.01)

This invention relates to improvements in power transmission mechanisms, and has special relation to power transmissions for automobiles and like motor vehicles employing change speed gearing shiftable to throw the drive mechanism into and out of gear with the motor and to vary the gearing ratio for change speed actions.

The ordinary way of shifting gears by means of a manually operable gear shift lever is clumsy, annoying, tedious and wearying, particularly where more or less frequent shifting is necessary, and one object of my invention is to provide means for obviating the use of a manually operable gear shift lever and to enable a practically automatic operation of the transmission to be obtained.

Another object of the invention is to provide an engine (preferably vacuum) operated control means which may be manually governed for forward or reverse driving motions, which after being selectively set for forward driving motion will thereafter be automatically governed for gear shifting actions according to the speed of the vehicle, and which in shifting from speed to speed and upon the vehicle coming to a stop will properly shift the transmission to neutral position.

Still another object of the invention is to provide a power transmission mechanism having control means which is simple, reliable and efficient in action and adapted to operate easily and smoothly and without clashing of gears, jerky motions or other objectionable working actions.

Still another object of the invention is to provide a power transmission with control means which, after being initially set into action, will automatically perform the work of shifting gears and operating the clutch in a manner similar to that performed by present manual control actions, so that a conventional type of transmission gears may be used.

Still another object of the invention is to provide a transmission control means which may be embodied in automobiles employing the usual gear shift lever with little or no change in the transmission gearing.

Still another object of the invention is to provide a control means which, in the event of breakage or derangement of any of its parts rendering it inoperable for automatic action, may be adjusted to permit use of the regular gear shift lever to operate the transmission manually in the usual way.

With these and other objects in view, which will appear in the course of the subjoined description, the invention consists of the features of construction, combination and arrangement of parts, hereinafter fully described and claimed, reference being had to the accompanying drawings, in which:

Fig. 1 is a top plan view of an automobile chassis showing the application of the invention to the engine and conventional type of transmission of an automobile.

Fig. 2 is a diagrammatic view of the apparatus showing all parts in neutral position.

Fig. 3 is a view showing the main control valve and governor, the valve being in high speed position.

Fig. 4 is a view of the main control valve in normal low speed neutral position.

Fig. 5 is a sectional view through the main control valve, showing the same in intermediate speed position.

Fig. 5a is a section on line 5a—5a of Fig. 3.

Fig. 6 is a plan view partly in section showing the synchronizing control connections between the transmission and clutch.

Fig. 7 is a front view of the governor, the main control valve lever being indicated in dotted lines.

Fig. 8 is a view of a portion of the governor showing the parts thereof in fully retracted position.

Fig. 9 is a view of one of the intermediate and high speed cylinders and associated auxiliary valve showing the same in high speed position.

Fig. 10 is a longitudinal sectional view of the auxiliary control or by-pass valve associated with the first and reverse speed cylinders, showing the valve in one of its positions.

Fig. 11 is a transverse section through the valve shown in Fig. 10, showing the valve in its other position.

Fig. 12 is a view of the relief valve associated with the first and reverse speed cylinders.

Figs. 13 and 14 are sectional views showing the first and reverse speed cylinders and associated parts in reverse and first speed positions respectively.

Fig. 15 is a view showing the clutch control valve opened for operation of the clutch.

Figs. 16, 17 and 18 are views respectively of the clutch pedal and clutch valve, and sectional views through the clutch valve showing its construction.

Figs. 19 and 20 are sectional views of the brake pedal operated valve, Fig. 20 being a section on line 20—20 of Fig. 19.

Fig. 21 is a sectional view through the transmission.

Fig. 22 is a front-to-rear section through the selector valve.

Fig. 23 is a cross-section on line 23—23 of Fig. 22, showing in full lines the selector valve member in cut-out position and in dotted lines in the reverse gear shift position.

Fig. 24 is a view of the relief valve similar to Fig. 12 showing the valve member in a different position.

Fig. 25 is a view of the brake pedal and valve controlled thereby.

Fig. 26 is a view of the parts of the manually operable gear shifting device, showing the detachable gear shift lever applied for use.

Fig. 27 is a view similar to Fig. 26 showing the gear shift lever removed and the cover cap applied.

Fig. 28 is a view showing a modification involving the use of a single primary and secondary motor cylinder and piston instead of a pair of primary cylinders and pistons and a pair of secondary cylinders and pistons, and also showing the cover cap of the gear shift lever casing or socket removed.

In the accompanying drawings I have shown my invention as designed to employ as operating devices pistons actuated by the vacuum produced by the automobile engine, and using for this purpose suitable suction, pressure and relief passages connected with the intake manifold of the engine and the atmosphere, which passages, for simplicity and convenience of illustration, are herein shown in the form of pipes or tubes, but it is to be understood that, as the control mechanism may be, if desired, mounted largely upon the transmission case cover, the passages referred to may be cast in the casing cover, and I, therefore, do not limit the invention in this or other respects to features illustrated in the form shown merely for exemplificative purposes, except when such features are expressly so defined in the appended claims.

Referring now more particularly to the drawings, 1 designates the chassis of an automobile, 2 the automobile engine, 2a the clutch, 3 the propeller shaft, 4 the transmission as a whole, 5 the transmission casing, 6 its cover, 7 the clutch shaft, 7a the transmission shaft, 7' the countershaft, 8 and 9 the low and reverse sliding gears on shaft 7a, 8' the low speed gear on shaft 7' forming with gear 8 the block of first or low speed gears, 9' the reverse gear on shaft 7' meshing with a free running idler gear (not shown) coacting with gear 9 to form the block of reverse gears, 10 the second or intermediate speed gear on shaft 7', 10' the second or intermediate and high speed gear on shaft 7a coacting with gear 10 on shaft 7' to form the second (or intermediate) speed gears, 11 the countershaft drive gear, 11' the main drive gear on shaft 7 meshing with gear 11 on shaft 7' and constituting with gear 10' on shaft 7a the clutch gears forming the high speed block to directly couple shafts 7 and 7a, 12 the universal joint, 13 and 14 the low and high speed gear shifter bars or rods, 13' and 14' gear shifter arms connected therewith, 15 the instrument board of the vehicle, 16 the intake manifold, 17 the clutch pedal, and 18 the brake pedal, all of which may be generally of the ordinary or any preferred construction. The shifter rods are constructed for coaction in the usual way with a gear shift lever A having an upper arm or handle A', a lower shifter arm A², selectively engageable with the notched shifter heads A³ on the shifter rods or bars 13 and 14, by opposite lateral movements of the arms A² from a neutral position in the usual manner, and an intermediate ball or pivot portion A⁴ adapted for pivotal mounting in a bearing socket on the cover 6. This bearing socket comprises a conical casing A⁵ having an opening in its top through which the lever and ball portions A², A⁴ may be inserted and removed and a threaded cap or closure member A⁶ adapted for engagement with the top of the casing which is threaded for its reception. The cap member A⁶ is provided with a slot or opening A⁷ through which the lever handle A' projects and a recess or socket A⁸ communicating therewith in which the ball portion A⁴ is fitted and which forms a bearing seat for the ball portion. A conical pressure spring A⁹ surrounds the arm A² within the casing and rests at its base upon a supporting flange or ledge A¹⁰ therein and bears at its top against the ball A⁴ to hold it in its neutral and rod engaging positions. Fig. 26 shows the gear shift lever applied for use for manual gear shifting actions, as when the power mechanism is rendered casually inoperative from any cause or is purposely rendered inoperative or thrown out of action by means of the cut-out valve 20. When use of the lever is not desired or required it may be removed with the cap A⁸, by merely unscrewing the latter, and the opening in the cap may then be closed by means of a threaded imperforate cap or cover A¹¹, as shown in Fig. 27. At all times when the automatic shift is in service the normal arrangement is or may be that shown in Fig. 27, the removable gear shift lever being carried as an accessory, as in the case of the carrying of a hand starting crank on a car having an automatic starter and which may be used for cranking purposes when the automatic starter is disabled from any cause. In the event, therefore, of the derangement of the automatic gear shifting mechanism of the car cap A¹¹ may be removed and the gear shift lever and its retaining cap A⁶ applied to permit of its use for manual gear shift actions.

The suction of the engine is employed in the particular form of the invention herein disclosed to shift the transmission gears, and to this end a main suction pipe or conduit 19 is connected with the intake manifold 16 and has arranged therein a spring-closed cut-out valve 20 coupled by a connection 20' to a button or knob 21ᵃ on the instrument board, by means of which the suction line 19 (and hence the automatic system as a whole) may be thrown out of action when, from any cause, it is desired to do this and to use a gear shift lever to manually shift the transmission gears in the usual way.

The control mechanism includes a pair of primary (first and reverse gear) gear shifting cylinders and pistons 21, a pair of secondary (second and third gear or intermediate and high gear) gear shifting cylinders and pistons 22, a main control valve 23 and auxiliary control valves 21a and 22a associated with the respective pairs of pistons. The pistons of each pair operate as a unit, and if desired or where space is available, a single cylinder and piston may be substituted for the pair 21 and likewise a single cylinder and piston may be substituted for the pair 22, as shown in Fig. 28. The purpose of providing a pair of pistons instead of a single piston is to avoid the necessity of employing a cylinder and piston of excessive size, which might be necessary under some conditions in order to obtain the proper amount of power where a comparatively small suction pull is obtainable, and by distributing this power pull to two cylinders instead of one the required power may be obtained.

The main control valve 23 comprises a casing 24 having sets of ports 25, 25', 26, 26', 27, 27', 28, 28' and 30, 31, respectively. In this casing is fitted a sliding valve 29 having two main ports 32, 33 extending transversely therethrough, for cooperation respectively with the set of ports 25, 25' and the sets of ports 26, 26' and 27, 27', respectively, and said valve is also provided with two angular ports 32' and 33', for cooperation with ports 26' and 30 and ports 31 and 27', respectively, and a port 34 for cooperation with ports 28, 28'.

The normal, neutral or first and reverse speed position of the valve is as shown in Fig. 4, in which port 32 registers with ports 25, 25' and port 34 registers with ports 28, 28', all other ports of the valve being closed. The valve is normally maintained in this position against movement to higher speed positions by the action of a spring 35 surrounding one of the normally projecting ends of the valve between the adjacent end of the casing and an abutment nut 36, by the adjustment of which the resistance of the spring to higher speed movement of the valve and accuracy of return movement of the valve from higher speed to normal position may be obtained. The opposite end of the valve, which projects beyond the opposite end of the casing, is coupled by a link 37' to a rocker lever 37 fulcrumed at 38 to a bracket 39 and having a forked arm 40 provided with friction rollers 41 engaged by the non-rotary ring member 42 of the longitudinally movable centrifugal governor collar 43 feathered to slide upon and rotate with shaft 7a and including a rotary ring member 44 slidable with the member 42 and engaged by the swinging governor arms 45 mounted in a casing 46 fixed to the rear end of the shaft 7a adjacent to the universal joint 12. The outward movement of the governor arms 45 tends to cause sliding movement of valve member 29 against the opposition of spring 35, the arrangement being such that at all speeds up to four or five miles per hour the valve will be maintained in normal position by spring 35, while upon an increase of speed up to fourteen or fifteen miles per hour governor arms 45 will move outward to a certain degree and move valve to the second speed position shown in Fig. 5, in which port 33 registers with ports 26, 26' and port 33' with ports 31, 27', to effect a proper gear change, all other ports being closed, while at speeds above fourteen or fifteen miles per hour during which the arms 45 reach their outermost position, the valve 29 will be further moved to third or high speed position in which port 33 of the valve will register with ports 27, 27' and port 32' with ports 26, 30, to effect a proper gear change, all other ports being closed, the valve then being set for all speeds above fourteen or fifteen miles per hour, at which shaft 7a will be clutched to and directly driven from shaft 7, the higher speed of the vehicle being governed by regulation of the quantity of fuel supplied to the motor. When the speed of the vehicle falls below fourteen miles per hour the spring 35 moves valve 29 backward to second or first speed position, as will be readily understood, to effect a corresponding automatic gear speed change, as fully hereinafter described. An adjustable stop 47 is provided on valve 29 to limit its return movement to normal position.

As shown, a piston 21b operates in each cylinder 21 and in its neutral position is arranged centrally in the cylinder between the first speed and reverse ports or ends of the cylinder and opposite a neutral port 67 therein. The stems of the pistons are connected for movement of the pistons in unison by a cross bar 21c with which is connected also the movable valve member 21d of valve 21a. The bar 21c has connected thereto the shifter fork or arm 21e which is connected by a pin 21f to the rod 13 which shifts the transmission gears 8 and 9.

A piston 22b operates in each cylinder 22 and in its neutral position is arranged centrally in the cylinder between the second and third speed cylinder ports or ends, and opposite neutral port 67. The stems of these pistons are connected for movement of the pistons in unison and said piston stems are coupled to one end of a centrally pivoted lever 22c, the opposite end of which is coupled to the sliding valve member 22d of valve 22a to shift the same simultaneously with the pistons. Also coupled to the piston rods is a shifter fork or arm 22e which is connected by a pin 22f to the rod 14 which shifts the transmission gear 10'.

For the purpose of securing the desired gear shifting actions by means of the suction of the engine, suitable governing valves, suction, pressure, neutralizing and relief conduits or lines are provided. These consist, besides the main suction pipe or conduit 19 and the valves above mentioned, of a suction pipe or conduit 48, extending between the port 28' of valve 23 and a low speed and reverse selector valve 49 and having arranged therein a clutch pedal operated automatic control valve 50, a suction line 51 connected to line 19 and to a brake pedal operated neutralizing or relief valve 52, said line 51 having branches 53, 54 and 55 leading to valve ports 28, 26 and 27, the branches 54 and 55 serving also as vent lines, suction lines 56 and 57 connecting valve 49 with the first speed and reverse ports 56' and 57' respectively of cylinders 21; a second speed line comprising a conduit 58 connected to the second speed ports 58' of the cylinders 22 and to valve 22a and also to the second speed port 59' of the cylinder 59 of a clutch and gear shift synchronizing device 60, a conduit 61 connecting conduit 58 with the valve 21a, a conduit 62 connecting main valve port 26' with valve 21a and with a by-pass 63, said conduits 61 and 62 serving alternately as suction and relief conduits in a second speed gear shift action, a suction conduit 64 connecting main valve port 27' with the third speed ports 58a of cylinders 22 and third speed port 59a of cylinder 59, said conduit 64 being also connected with valve 22a, conduits 65 and 66 connecting valves 22a and 52; and a neutralizing line composed of conduits 67 connected to the central neutralizing ports 67' and with ports 25 and 25' of the main valve 23, the valve 21a and valve 52, a relief branch 68 connecting conduits 56 and 57, a relief conduit 69 connected with the second speed end of one cylinder 22 and third speed end of the other cylinder 22, a relief valve 70 in the conduits 68 and 69, and a relief valve 71 in conduit 56.

The sliding valve member 21d of valve 21a is provided with a transverse port 72 to register with ports in the valve casing to connect conduits 61 and 62 through by-pass 63, as shown in Fig. 10, when the valve is in an advanced position and said valve has a transverse groove or recess 73 for registration with ports 74 to connect pipes 62 and 67 when the valve member 24d is in a rearward or retracted position. The valve member 22d of valve 22a is also slidably mounted in its casing but has two ports 75 and 76, port 75 acting to connect conduits 66 and 56 when the valve member is in an advanced position and port 76 acting to connect conduits 64 and 65 when the valve member is in a rearwardly moved position. The selector valve 49 comprises a casing containing a rotary valve member 77 operable by a hand lever 78, said valve member being provided with two ports or passages 79 and 80, operating when valve member 77 is given a quarter turn in one direction from a cut-out position to connect conduit 48 with conduit 56 and conduit 57 with an air vent 81 and operating when valve member 77 is given a quarter turn in the opposite direction from the cut-out position to connect conduit 48 with conduit 57 and to connect conduit 56 with the air vent 81. In the neutral position valve 49 cuts out communication between the suction conduit 48 and the conduits 56 and 57 and is adjustable to either of the stated positions to effect, in the normal position of valve 23, connections between the pipes 48, 56, 57 and the atmosphere to cause the operation of the pistons 21b for either a shift of the transmission gearing to first speed or for a reverse action subject to the operation of valve 50 to connect the two portions of conduit 48 in which it is interposed. Valve 49 is thus operable to effect shifting of the gears to reverse or first speed position and the return of the pistons from reverse and first speed shift positions to neutral position on either of such gear shifts. A spring-pressed ball or spherical detent 82 operates to hold the valve member 77 against casual movement in any of its positions of adjustment.

Valve 50 controls communication between the suction and shift lines to prevent any gear shift action until the clutch is opened, so as to prevent damage to or strains on the transmission gear. It comprises a casing having a rotary valve member 83 therein provided with a diametric port 84 movable into and out of registration with openings in the casing to simultaneously connect or disconnect the branches of conduit 48 between which the valve is arranged. The valve 50 is normally closed and controls communication between the main control valve 23 and valve 49 controlling the first speed and reverse lines 56, 57. To the valve member 83 is connected an operating arm 85 having at its free end an opening through which loosely passes one end of a connecting rod 86, the opposite end of which is pivoted to the clutch lever 17. Surrounding the rear end of the rod between the arm 85 and an abutment and adjustment nut 87 on the arm is a coiled abutment motion transmitting and compensating spring 88. When the clutch pedal 17 is depressed to open the clutch motion is transmitted through rod 86 and spring 88 to the arm 85 to move valve member 83 to open position. The range of movement of arm 85 and valve member 83 is small, much less than the full range of movement of the clutch lever 17, and the opening and closing movements of said valve member are limited by a stop pin 89 and coacting stop shoulders 90 on the valve member and casing to always ensure a proper and fixed degree of movement of the valve member irrespective of the degrees of movement of the clutch pedal 17. The sliding and pivotal connection of rod 86 with arm 85 and yielding motion transmitting action of the spring 88 ensures full movement of valve member 83 to open position and a continued movement of the pedal 17 thereafter through the compensating compression of spring 88, to effect the closing of the valve and opening of the clutch. A nut or other suitable abutment 91 on rod 86 operates to engage and move valve arm 85 back to valve closing position on the return clutch closing movement of pedal 17.

Valve 52 is similar in type to valve 50 and comprises a casing in which is a rotary valve member 92 having a vent passage 93 and vent port 94 for connecting conduits 67 and 19—51 with the atmosphere in the open position of the valve and in the rotary valve member is also a port 95 for connecting conduits 65 and 66 in the open position of the valve. The valve member 92 like the valve member 83 of the valve 50 is limited in its opening and closing movements by a stop pin 96 and coacting stop shoulders 97 on the valve member and casing and is provided with an operating arm 98 having an opening at its free end for loose passage of one end of a rod 99 pivotally connected at its opposite end to the foot brake pedal 18. Surrounding the first-named end of rod 99 between the arm 98 and an abutment and adjusting nut 100 is a coiled spring 101 for transmitting valve opening movement to arm 98 on the operation of brake pedal 18 to set the brakes, the spring 101 adapting the valve to be opened before the end of brake applying movement of pedal 18 and an adjustable abutment nut 102 being provided on the rod to engage arm 98 and return the valve to closed position on the release and retraction of brake pedal 18.

Valve 70 is a relief valve which may be placed on the instrument board for hand operation, but is preferably placed on the foot board for foot operation. It comprises a casing having a set of ports connected with vent branches 68 and 57ᵃ in conduits 56 and 57 and a set of ports connected with portions of conduit 69 in which said casing is interposed. The lower end of the casing is open, and in the casing is fitted a sliding valve member 103 having a longitudinal vent passage 104 open to the atmosphere at the lower end of the casing and provided with cross passages 105 and 106 for registration with the conduits 68, 57ᵃ and 69 for connecting said conduits with the atmosphere when the valve member is depressed from normally open to closed position. The upper end of the valve member projects upward through and above the casing and is provided with an operating button or head 107 between which and the casing is disposed a spring 108 normally holding the valve member elevated and closed. The purpose of this valve is to provide a vent for all cylinders 21 and 22 to the atmosphere to prevent any air-locking or other resistance to the movement of pistons 21b and 22b in the use of a gear shift lever to manually operate the gear shift mechanism in the usual way in the event that it is desired to temporarily do so, as when, due to accidental leaks or other causes, the automatic system becomes for the time being inoperative. In such event cap A¹¹ may be removed from the ball casing A⁵ and the gear shift lever applied for use, after which cut-out valve 20 is closed to disconnect the suction line from the intake manifold 16, and then, as the clutch pedal is depressed by one foot of the operator the other foot may be used to depress and open valve 70 as the gear shift lever is operated to permit the gear shift mechanism to have full movement. Thus should the automatic (suction) mechanism be incapable of action at any time the driver may apply and employ a gear shift lever in the ordinary way to operate the car until the suction mechanism is repaired, in the same way that a hand crank may be used to crank the engine in the event that the automatic starter will not work.

Valve 71 is a relief valve arranged in conduit 56 to provide a vent to atmosphere and allow pistons 21b in cylinders 21 to return to neutral position after shifting to first speed and on a gear shift from first to second speed. This valve 71 comprises a casing in which is a sliding valve member 109 having a passage 71' normally open to line 56 and having a vent port 110 and a vent passage 110' leading therefrom to its rear end where it opens to the atmosphere. The valve member 109 is held in normal position in which its passage connects the portions of conduit 56 between which it is arranged by a spring 111 and is provided at its forward end with a bell-crank locking member or latch 112 having a latch arm 113 formed with a bevel faced latch hook 114 and a control arm 115 on which acts a leaf spring 116 normally holding the latch in latching position and which allows the latch hook to yield to permit the extended latch end 117 of the cross-bar 21c to ride over the bevel face of the latch hook and to snap into engagement with the shoulder of the latch hook in the backward movement of the pistons 21b and bar 21c from a neutral position to first speed shift position in readiness for movement of the valve to air intake position on the return motion of the pistons to neutral position. At the same time valve member 21d of valve 21a is shifted to bring its port 73 into register with conduits 62 and 67 so as to connect the neutralizing ports of cylinders 21 through valve 23 with suction line 19 when valve 23 moves to second speed position, as hereinafter set forth in the description of the first to second speed shift. On a movement, therefore, of pistons 22b from neutral to second speed position pistons 21b move from first speed to neutral position, thus shifting valve member 109 to cause its port 110 to register with conduit 56, whereby air is allowed to enter the first speed ends of cylinders 21 on such movement of pistons 21b, thereby adapting the pistons to have free motion. Just before the pistons 21b reach neutral position latch 114 is released by engagement of its control arm 115 with a contact pin 115', allowing spring 111 to return valve member 109 to normal position.

The reverse shift action

The engine being in motion and it being desired to reverse the car or cause it to move backward, valve 20, if closed, is opened and valve member 77 of selector valve 49 is turned to reverse position, so as to connect conduit 57 with suction line 48 and conduit 56 with the atmosphere through said valve. Valve 23 being in its normal position and properly positioned for this action, and upon the clutch being depressed to open valve 50, a suction pull is created in ends 57' of cylinders 21 to move pistons 21b from neutral position toward such ends of the cylinders, in which action air is admitted to cylinder ends 56' through conduit 56 and valve 49. The reverse gears of the transmission are thus shifted for a reverse movement of the vehicle on the closing of the clutch whereby valve 50 will be closed. On the return of valve 49 to neutral position and operation of the brake pedal 18, which shifts valve 52 to neutralizing position, the cylinders 21 will be connected with the suction line 19 and the neutralizing line 67 for return of the pistons 21b to neutral position, as hereinafter described.

Operation in shift from neutral to first speed

Selector valve 49 is adjusted from neutral to first speed position in which valve member 77 is shifted clockwise in which its port 79 connects suction conduit 48 with first speed conduit 56 and its port 80 connects relief conduit 57 with air port 81, so that by the suction pull in conduit 56 and the right hand ends of the cylinders 21 the pistons in said cylinders will be drawn in that direction and valve 21a moved in the same direction but on an idle motion. The movement of pistons of cylinder 21 in this action effects through link 21e (Fig. 21) adjustment of the rod 13 to throw the first speed gears into mesh. Also in this operation the extended end 117 of the cross bar 21c connecting the first speed pistons is shifted from neutral position shown in Figs. 12 and 13 to the position shown in Figs. 12 and 14 in which it engages spring-actuated latch 114, thus coupling the pistons to valve 109 ready to move the valve to vent position on the return stroke of the pistons to neutral position. At the same time valve 21d is shifted to cause its port 73 to connect lines 62 and 67 for a shift of pistons 21b back to neutral position when valve 23 moves to second speed position. On the adjustment of valve 49 to the first speed position, as above described, the operator secures the piston and gear shift actions above-described by depressing the clutch pedal to open the clutch, in which action the valve 50 is adjusted from a closed position to open communication between the suction line 48 and the main control valve 23. In this manner pipes 48 and 56 are connected through valve 23 with suction line 19 leading from the intake manifold, so that a suction pull is exerted in pipes 48 and 56 to secure the movements of cylinder piston 21b above described. Upon the release of the clutch pedal the car will then be set into motion. As the speed of the car is then increased by pressure upon the accelerator in the usual manner to a speed of about four to six miles an hour, more or less, the governor arms 45 come into action to automatically control the valve 23 to effect an automatic shifting of the gears to higher speeds. The movement of valve 23 in a forward direction is effected against the resistance of its spring 35 by the action of the weighted governor arms in their outward movement under centrifugal force, whereby the governor collar is slidably adjusted to shift the valve through the link connection 37'.

Operation in shift from first to second speed

Fig. 4 shows the starting or fully retracted or neutral position of valve 23 in which all of its ports are closed except valve ports 25, 25', 28, 28', 32 and 34 connecting neutral line 67 to the centers of all cylinders 21 and 22 and the brake valve 52, and ports 28, 28', 34 connecting main suction line 19 with suction line 48 leading to clutch valve 50 and selector valve 49. Thus in the normal position of valve 23 the apparatus is in condition for shifting of gears to first speed or to reverse position by movement of valve 49 to first speed or reverse position and the opening of clutch valve 50 as hereinafter described. From first speed position to second speed position shown in Fig. 5 movement of the valve 23 is effected by the governor arms 45 which shift the valve to such position, thereby connecting the neutralizing ports of cylinder 21 and the left hand ends of cylinders 22 with the suction line 19 and the right hand ends of cylinders 22 with the atmosphere for movement of pistons 22b to second speed position through valve 23 and on the opening of the clutch. The connection of the neutralizing ports of cylinders 21 directly with the main suction line 19 results in a pressure differential being established in cylinders 21, the suction established through the neutralizing ports at the left hand ends of the cylinders being somewhat greater than that previously established at the right hand ends of the cylinders for the first speed shift, such differential being sufficient to move the pistons 21b to the left to an extent to bring vent 110 of valve in position to break the suction at the right hand end of cylinders and cause pistons 21b to shift to neutral position when valve 23 moves to second speed position and the clutch is disengaged. It is evident that in the normal position of valve 23 the neutral line 67 is connected with the brake valve 52 so that when the vehicle is brought to a stop by operation of the foot brake the gearing will be returned to neutral position by the connection through valve 23 and valve 52 of conduits 65, 66, 51 and 67, when the valve 23 is open, with main suction line 19 whereby a suction pull is exerted in the centers of cylinders 21 and 22 to return the cylinder pistons to neutral position, whereby an adjustment of the transmission gears to neutral position is effected. This operation will be effected irrespective of the speed at which the vehicle is traveling before brought to a stop, and in such neutralizing action a vent is effected in order to permit return of the proper pistons to neutral position by a vent action through valve 21a or 71 in case of cylinders 21, or a vent action through valve 22a in case of cylinders 22, or a vent action through valve 49 in case of the gearing having been set in reverse.

*Movement from second to third speed*

After the car goes into second speed and its speed is increased to a speed of from fourteen to sixteen miles an hour, more or less, the action of the weighted governor arms in moving through and up to a final outward position, as shown in Fig. 3, moves the valve 23 through and up to a final forward position against the resistance of its spring and thereby shifts valve 23 to connect the third speed branch of the main suction line with suction line 64 leading to cylinders 22 and also moving port 32' in line with port 30 thus providing a vent from said cylinders on the opposite side of the pistons, so that a suction pull will be exerted to move the pistons in cylinders 22 to the right to shift the rod 14 to throw the high speed gears of the transmission into mesh. The gearing will thus be coupled for driving the vehicle at all speeds above seven or eight miles an hour, the speed being regulated by the supply of motive fuel in the usual manner to the engine, and in the event that the speed should fall to a predetermined low speed, as in the neighborhood of seven or eight miles an hour or less, the action of the governor arms in swinging inwardly at the reduced speed in removing a forward pull pressure on the valve 23 to allow the valve spring to shift the valve rearwardly or in the reverse direction to that previously described. When in this rearward motion of the valve the valve returns to the position shown in Fig. 5, in which valve ports will be connected with the second speed branch of the main suction line to effect a return of the high speed gears to second speed position, and the adjustment of the valve spring 35 and operation of the valve 50 by the clutch is such that the valve controls the actions of the cylinders and pistons 23 for automatically adjusting the high speed transmission gears for second and third speeds without any manual adjustments on the part of the driver of the vehicle or any manual adjustments of the clutch. In the slowing down of the vehicle to a low speed the valve 23 controls the speed gearing to maintain it in either second or third speeds until the vehicle is either brought to a stop or its speed falls so low that the valve 23 is permitted by retraction of the governor arms and the action of its spring to return to normal position, in which event the valve will again occupy the position shown in Figs. 2 and 4, thus connecting the neutral line of all cylinders with the suction line 67 through the brake valve 52, which is opened by pressure of the brake pedal in the slowing down of the vehicle to very low speed, thus allowing the pistons in the cylinders to return to neutral position and a shift of the high speed gears to neutral position, and simultaneously, through the automatic opening of the clutch valve 50, as hereinafter described, a connection is effected between the cylinders 21 and the suction line through said valve and the selector valve 49 to effect the movement of said pistons to shift the first speed gears into mesh. Should, however, it be desired to bring the car to a stop and to effect a return of all parts to neutral position, irrespective of the speed at which the car has been driven and the meshing action of the speed gears, this may be obtained by applying the brake to open valve 52 and by shifting the selector valve 49 to neutral position, in which position the gears will remain as long as valve 49 remains in neutral position. Should, after the shifting of the transmission gears from second to first speed position in the running of the car, the speed of the car be increased by accelerator action, an automatic shifting of the speed gear from first to high speed position will take place in the manner previously described.

It will be evident from the above-described change-over shift-action from motor cylinders 21 to motor cylinders 22, for a shift from low gear to second gear, that the valve member 21d, in the low gear position of pistons 21b, is disposed so that its port 73 connects the lines 62, 67 so that, when valve 23 is in position for the second speed gear shift, a suction is created in the cylinder 21 to pull the pistons from first speed back to neutral position, thus neutralizing the first speed gears. In this movement of the pistons 21b back from first speed to neutral position valve member 21d is shifted by said pistons to the position shown in Fig. 10, in which said valve member connects line 62 with line 61 through the by-pass 63, thus connecting valve 23 and the cylinders 22 to establish in the latter a suction to pull the pistons 22b therein from neutral to second speed position, whereby the necessary neutralizing and shift actions in effecting the gear change from first to second speed is secured by the use of a single control valve operated by the piston of the primary cylinder.

*Synchronizing mechanism for controlling the clutch*

Associated with the second and third speed shifters is a clutch opening device which automatically opens the clutch, which is closed by its closing spring, on each shift from first to second and second to third speeds and back in order from third to first speed, and also associated with said second and third speed shifters is a synchronizing device for synchronizing the shifting and clutch actions and properly governing the time period of opening of the clutch or retarding its closing movement after opening to prevent the clutch from closing too rapidly or while the shifting action is in progress or until it is completed. In addition, I also provide a device operating responsively to the movements of the clutch controlling means to govern the feed of fuel to the engine and prevent racing of the engine during a gear shift action.

In starting the vehicle and setting it into first speed the clutch pedal 17 is depressed in the usual manner to keep the clutch open until the first speed gears are in mesh. Thereafter whenever a change speed action occurs in the running of the car the clutch is automatically opened and closed by the action of a clutch control mechanism operating in synchronism with the gear shifting mechanism. This clutch control mechanism comprises a pedal actuating cylinder 118 in which is a piston 119 connected by a flexible cable 120 with the clutch pedal. The cylinder 118 is in connection with the suction line 19 through a pipe 119' containing a clutch control valve 120', which valve 120' is normally maintained in a closed position by a spring 121 and is adapted to be opened by means of a cable 122 connected with one arm of a lever 123, centrally pivoted, as at 123ª, of the synchronizing device 60. One arm of this lever carries a pivoted dog or latch 124 having a control arm 125, and the other arm of lever 123 carries a pivoted operating arm 126 having a cam surface 127 arranged for cooperation with a contact pin 128, the two members 124 and 126 being maintained in a normal position by an interconnecting spring 129. Arm 125 is arranged to cooperate with an adjustable stop pin or screw 130 mounted on a fixed part of the vehicle for retracting the latch 124, as hereinafter described, which latch, together with the operating arm 126, are adapted for cooperation with a disk or head 131 on one end of a piston rod 132 connected to a piston 133 operating in a small control cylinder 59 connected at its opposite ends with pipes 135 and 136 connected with the second and third speed lines 58, 64, the piston 133 being shiftable to opposite positions by suction induced respectively in such lines. Figs. 2 and 6 show in full lines the position of the parts of the synchronizing mechanism when the transmission is in second speed and preparatory to shifting movement into third speed, while Fig. 6 shows the dotted line position of the piston 133 when the transmission mechanism is in third speed and preparatory to its movement into second speed. Assuming that the parts are in the position represented by the dotted line position shown in Fig. 6, and that the main control valve is operated to shift the gearing from high speed to second speed position, a suction pull will be exerted in the line 135 to move the piston outward. As the piston moves outward its head 131 engages the outer end of the arm 126 and forces it rearwardly, thus swinging lever 123 on its pivot to move its end to which arm 126 is attached rearwardly and its end to which latch 124 is attached forwardly, thus causing the cam surface 127 of arm 126 to ride in contact with pin 128 so as to swing arm 126 out of the path of travel of disk 131, which thus passes beyond the free end of said arm and rides over the beveled end of the latch 124 and is engaged and held by said latch, whereby the lever 123 is coupled to the piston 133 for return thereby to normal position on the reverse movement of said piston. The movement of the latch arm of lever 123 to which cable 122 is attached causes a shifting of valve 120' to open position, thus connecting pipe 19 with cylinder 118 and causing a suction in the cylinder whereby piston 119 is operated to depress the clutch pedal 17 and open the clutch and simultaneously open the clutch valve 50. The clutch will therefore be opened during the shifting of the gears and, in order to properly control and prevent racing of the engine during the transmission stage, I provide means operated on the depression of pedal 17 to partially or wholly close the butterfly valve 137 in the carbureter intake 138 to reduce or cut off momentarily the supply of fuel to the engine. The means for this purpose comprises a slotted arm 139 connected by a rod 140 to one arm of a bell crank lever 141 arranged to be engaged by a roller 142 on the pedal 17 when the latter is depressed. Upon the return of pedal 17 to normal position, the carbureter spring commonly used returns valve 137 to open position. On the rod 140 is a contact member 143 arranged for cooperation with a valve retarder 144 comprising a bell-crank lever-like member normally maintained in a predetermined position by a spring 145, one arm of which member is arranged to lie in the path of movement of the contact 143 and the other arm of which member is arranged to engage the adjacent end of lever 126 to frictionally oppose a resistance to the movement of said lever back to valve closing position, as shown in Figs. 2, 6 and 15, thus keeping the clutch open for a sufficient period of time to permit the speed gears to operate and prevent the too sudden movement of the clutch to closed position. At the end of such period contact 143 comes into engagement with the retarder 144 and disengages the same from the lever 123 to permit it to return to normal position. The parts of the synchronizing mechanism remain in the position shown in full lines in Figs. 2 and 6 as long as the transmission is not operated for a speed change. During the shift of the speed gearing from second speed to high speed, however, the cylinder 118 is connected, as before described, through pipe 119' with the suction line and the piston 119 is drawn upwardly into the cylinder 118. In this action the head 131 draws the latch 124 rearwardly and pulls the arm of lever 123 to which it is attached in the direction to open the valve 120' hold the same open to maintain communication between suction line 19 and cylinder 118 until arm 125 of latch 124 engages the stop 130 whereupon the latch will be swung outwardly to release the disk 131, at which time spring 129 will return parts 124 and 126 to normal position and spring 121 will close valve 120'. Any suitable means, such as air intake ports in valve 120' and its casing, may be provided to admit atmospheric air into the cylinder 118 above the piston to provide for its downward movement in the cylinder to permit the clutch to engage after a clutch disengaging action.

As stated, valve 20 is provided in order that connection between the automatic system and the intake manifold may be closed whenever it is desired to throw the automatic mechanism out of operation and to enable the gear shift lever to be used. Whenever valve 20 is closed it is necessary to move the relief valve 70 to open position, whereby both sets of pistons will be connected with vents leading to the atmosphere, thus allowing the parts to be operated without resistance.

It will be observed that all the parts of the gear shift power mechanism proper, that is, the motor cylinders and pistons, their controlling valves, the ports and passages communicating therewith for fluid supply and vent actions, and the operating ports or connections between the pistons and the shifter rods 13 and 14 are carried by namely, mounted on or formed in the cover plate 6, thus forming with the cover a gear shift power mechanism constructed as a unit with said cover so as to be applied or removed with the cover to and from the transmission casing or housing in such manner that the shifter forks 21e and 22e may be coupled to or uncoupled from the shifter rods 13 and 14 by simply applying or removing the pins 21f and 22f. Also it will be seen that the power unit so constructed may be applied to a conventional type of transmission by simply applying the unit so constructed in place of the ordinary transmission case head or cover.

What I claim is:

1. In an automobile gear shift mechanism, in combination with variable speed gearing, pneumatic means embodying a cylinder and a piston shiftable in opposite directions therein for automatically operating said gearing for gear shift actions, manually operable means for operating said gearing for gear shift actions, and air vent means for connecting the cylinder of said pneumatic power means on both sides of the piston with the atmosphere in the use of said manually operable means.

2. In an automobile gear shift mechanism, and in combination with high and intermediate speed and low speed and reverse gearing, pneumatic means for automatically operating said gearing for gear shifting actions, and a pneumatic clutch actuating device, and a synchronizing device set into action on actuation of said clutch actuating device to retain the clutch released during a gear shifting movement and until such movement is completed.

3. In an automobile gear shift mechanism, and in combination with variable speed gearing, pneumatic means embodying a cylinder and a piston shiftable in opposite directions therein for automatically operating said gearing for gear shifting actions, manually operable means for operating said gearing for gear shifting actions including a permanently mounted gear shift member and a removable member engageable with and disengageable from said permanently mounted member, and an air vent means for connecting the cylinder of said pneumatic means on both sides of the piston with the atmosphere in the operation of the same by the manually operable means.

4. In an automobile gear shift mechanism, and in combination with high and intermediate speed and low speed and reverse gearing, pneumatic power means including cylinders and pistons for respectively operating the low and reverse and intermediate and high speed gears, manually operable means for selectively operating the first-named power device for effecting a shift action of either the low speed or reverse gear thereby, and means separate from and independent of said manually operable means for automatically controlling the power means after the gearing has been set in first speed to shift the gearing responsive to varying speeds of the vehicle.

5. In an automobile gear shift mechanism, and in combination with the transmission gearing of the vehicle having low speed and reverse gears and intermediate and high speed gears, pneumatic power means for shifting the low speed and reverse gears and the intermediate and high speed gears into and out of action, a selector valve device governing the flow of fluid to the power means for selectively controlling the action of the power means to secure either a first speed or reverse gear shift, a valve device separate from and independent of the selector valve device and governed by the speed of the car controlling the flow of fluid to the power means for automatically effecting shifting of the gears to different forward driving speeds following an initial shifting of the gearing to low speed, a clutch, and valve controlled means for automatically opening and closing the clutch on each gear shifting action.

6. In an automobile gear shift mechanism, and in combination with high and intermediate speed and low speed and reverse gearing, fluid pressure operated power means for shifting the gears, a manually operable means for selectively governing the supply of pressure fluid to the power means for effecting a shifting of the gears into either low speed or reverse, and automatic means separate from and independent of the manually operable selective means and acting responsively to the speed of the vehicle for governing the supply of pressure fluid to the power means for effecting a shifting of the gears to different forward driving speed positions.

7. In an automobile gear shift mechanism, and in combination with high and intermediate speed and low speed and reverse gearing, fluid pressure operated power means for shifting the gears, a fluid pressure operated clutch, means selectively governing the power means for effecting a shifting of the gears into low speed or reverse, automatic valve controlled means responsive to the speed of the vehicle governing the power means for effecting a shifting of the gears to different forward driving speed positions, and valve controlled means for effecting the opening of the clutch preliminary to a gear shifting action and preventing closing of the clutch while the gears are being shifted.

8. In a gear shifting mechanism for automobiles, a transmission gearing, a clutch, means for manually operating the clutch, pneumatic power means for operating the gearing and coordinately opening and closing the clutch, and manually operable means for shifting the gearing in the event of derangement of the pneumatic power means, said manually operable means comprising a manually operable gear shift member, a casing for said member having an opening through which said member is accessible, a gear shift lever insertible and withdrawable through said opening for engagement with and disengagement from said member, and a detachable closure for closing the opening when the lever is removed.

9. A gear shift mechanism of the character set forth in claim 6 wherein the power means comprises cylinders and pistons, and wherein the automatic means responsive to the speed of the vehicle comprises a control valve, a governor for actuating the control valve and auxiliary valves coacting with the control to return the pistons to neutral position after one gear shifting action and before the ensuing gear shifting action.

10. A gear shift mechanism of the character set forth in claim 6 employing an automatic clutch and means operated by the clutch to prevent actuation of the power means for a speed change in the engaged position of the clutch.

11. In an automobile gear shift mechanism, and in combination with high and intermediate speed and low speed gearing, pneumatic power means for operating the low and intermediate and high speed gears, a manually operable valve for selectively controlling the supply of pressure fluid to the power means to effect either a low or a reverse gear shift action thereby, and a sliding governor valve separate from and independent of said manually operable valve for automatically controlling the supply of pressure to the power means after the gearing has been set in first speed to shift the gearing responsive to varying speeds of the vehicle.

12. In an automobile gear shift mechanism, and in combination with the transmission gearing of the vehicle, having low speed and reverse gears and intermediate and high speed gears, pneumatic power means for shifting the gears into and out of action, a manually operable rotary valve device governing the flow of motive fluid for selectively controlling the action of the power means to secure either a low speed or a main control valve device separate from and independent of the rotary valve device, and a centrifugal governor controlled in action by the speed of the car for automatically operating the second-named valve device for controlling the flow of motive fluid to the power means for effecting shifting of the gears to different forward driving speeds following an initial shifting of the gearing to low speed.

13. In an automobile gear shift mechanism, and in combination with the transmission gearing of the vehicle having low speed and reverse gears and intermediate and high speed gears, pneumatic power means for shifting the low speed and reverse gears and the intermediate and high speed gears into and out of action, a selector valve device governing the flow of fluid to the power means for selectively controlling the action of the power means to secure either a first speed or reverse gear shift, valve controlled means separate from and independent of said valve device and governed by the speed of the car for controlling the flow of fluid to the power means for automatically effecting shifting of the gears to different forward driving speeds following an initial shifting of the gearing to low speed, a clutch, and valve controlled means for automatically opening and closing the clutch on each gear shifting action.

14. In an automobile gear shift mechanism, and in combination with the transmission gearing of the vehicle having low speed and reverse gears and intermediate and high speed gears, pneumatic power means for shifting the low speed and reverse gears and the intermediate and high speed gears into and out of action, a selector valve device governing the flow of fluid to the power means for selectively controlling the action of the power means to secure a first speed gear shift, valve controlled means separate from and independent of said valve device and governed by the speed of the car for automatically controlling the flow of fluid to the power means for automatically effecting shifting of the gears to different forward driving speeds following an initial shifting of the gearing to low speed, a clutch, and valve controlled means for automatically opening and closing the clutch on each gear shift action.

15. In an automatic gear shift mechanism, and in combination with the transmission gearing of the vehicle having low speed and reverse gears and intermediate and high speed gears, pneumatic power means for shifting the gears into and out of action, a manually operable rotary valve device governing the flow of fluid to the power means for selectively controlling the action of the power means to secure either a first speed gear shift or a reverse gear shift a 5 ... valve separate from and independent of the rotary valve device for controlling the flow of fluid to the power means for automatically effecting shifting of the gears to different forward driving speeds following an initial shifting of the gearing to low speed, and a centrifugal governor actuated by a driven part of the transmission gearing for operating the governor valve.

16. In an automobile gear shift mechanism, and in combination with the transmission gearing of the vehicle having low speed and reverse gears and intermediate and high speed gears, pneumatic power means for shifting the low speed and reverse gears and the intermediate and high speed gears into and out of action, a valve device operative for selectively controlling the action of the power means to secure either a first speed or reverse gear shift, valve controlled means separate from and independent of said valve device and governed by the speed of the car for automatically effecting shifting of the gears to different forward driving speeds following an initial shifting of the gearing to low speed, a clutch, a valve controlled pneumatic device for automatically opening and closing the clutch on each gear shifting action, and means controlled in action by said pneumatic device for retaining the clutch in the released position during gear shifting action.

17. In an automobile gear shift mechanism, and in combination with change speed gearing, pneumatic power means for shifting the gearing, a clutch, means for operating the clutch, valve mechanism for controlling the flow of fluid to the power means for effecting a shifting of the gears for change speed actions, a clutch operated valve controlling the flow of fluid pressure to the valve mechanism, and manually operable emergency valve means independent of the clutch and clutch valve operating means and controlling the flow of fluid to the power means for shifting the gearing to neutral position.

18. In an automobile gear shift mechanism, and in combination with change speed gearing and a brake applying means, pneumatic power means for shifting the gearing, valve mechanism governing the supply of fluid pressure to the power means for effecting a shifting of the gears for change speed actions, and a valve independent of said valve mechanism and directly coupled to and actuated by the brake applying means for governing the flow of fluid pressure for shifting the gearing to neutral position in a brake applying action.

19. In an automobile gear shift mechanism, and in combination with high and intermediate speed and low speed and reverse gearing, fluid pressure operated power means for shifting the gears, a fluid pressure operated clutch, valve controlled means for effecting operation of the clutch, and a synchronizing device acting in coordination with said valve controlled means for preventing the closing of the clutch while the gears are shifting and until the shifting action is completed.

20. In a gear shift mechanism for automobiles having a transmission gearing, and pneumatic power mechanism for shifting said gearing for different speed changes comprising cylinders and pistons, a manually operable selector valve controlling the gearing for reverse and first speed shifts, a governor actuated main valve separate from and independent of the selector valve controlling the gearing for automatic shifts between first and high speeds following a first speed shift, and auxiliary valves coacting therewith to return the pistons to neutral position after one shifting action and before the ensuing gear shifting action.

21. In a gear shift mechanism for automobiles having a transmission gearing and a clutch for connecting said gearing with and disconnecting it from the engine, fluid pressure operated power mechanism for shifting the gearing, a clutch operating device comprising a cylinder and piston, and a fluid pressure controlled device for preventing the closing movement of the clutch after the clutch is opened and while the gears are shifting and until the shifting action is completed.

22. In a gear shift mechanism for automobiles having a transmission gearing and a brake mechanism, fluid pressure operated power means for shifting said gearing, speed controlled valve mechanism for supplying fluid under pressure to the power means, and means operated by the brake mechanism on actuation and coacting with said valve mechanism to return the gearing to neutral position.

23. In a gear shift mechanism for automobiles having a transmission gearing, a clutch for connecting the gearing with the engine, a clutch operating device, a clutch retarder governing the operation of the clutch operating device, and a synchronizing device governing the action of the clutch retarder and governed in action by said control device to cause the retarder to time the closing movement of the clutch with respect to a gear shifting action so as to prevent closing of the clutch while the gears are being shifted.

24. In an automatic gear shift mechanism, and in combination with reverse, low, high and intermediate speed gears, pneumatic power means for automatically shifting the gears, a clutch, automatic means for opening and closing the clutch on each gear shift action, manually operable means for opening and closing the clutch, selective means controlling the supply of pressure fluid to the power means for an automatic low speed or reverse gear shift, a device controlled by the speed of the vehicle to govern the supply of pressure fluid to the power means for automatic forward drive gear shift actions, and manually operable means for shifting the gearing in the event of derangement of the automatic means.

25. In an automatic gear shift for automobiles, a gear shift mechanism, pneumatic power means for shifting the gearing, means manually controlling the power means for governing the same to make certain shifts, means controlled by the speed of the vehicle to automatically control the power means for different speed shifts in the forward running of the vehicle, manually operable means for shifting the gearing independent of the power means, and means for connecting the pneumatic power means with the atmosphere for a vent action to permit free shifting action in the use of said manually operable means.

26. In an automobile gear shift mechanism, and in combination with a change speed gearing, fluid pressure operated power mechanism for shifting the gearing, valve mechanism embodying a valve governed by the speed of the vehicle to automatically control the supply of pressure fluid to the power mechanism to effect change speed shifts of the change speed gearing, a clutch for connecting the change speed gearing with and disconnecting it from the engine, a clutch controlled valve for rendering the valve mechanism for a shift action of the gearing when the clutch is disengaged and inoperative for a shift action of the gearing when the clutch is engaged, and pneumatic means controlled by said valve mechanism for actuating the clutch when the valve mechanism is in position for a clutch and speed change action.

27. In an automobile gear shift mechanism, and in combination with reverse and forward drive gearing, fluid pressure operated power mechanism for shifting the gearing, a valve governed by the speed of the vehicle to automatically control the supply of pressure fluid to the power mechanism for shift actions, a clutch for engaging the gearing with and disengaging it from the vehicle engine, a clutch controlled valve opened and closed on clutch opening and closing movements coacting with the speed governed valve for letting on the supply of pressure fluid to the power mechanism on the disengaging movement of the clutch and cutting off the supply of pressure fluid to the power mechanism on the engaging movement of the clutch, and means for actuating the clutch.

28. In an automobile gear shift mechanism, and in combination with a reverse and forward drive gearing, pneumatic power mechanism for shifting the gearing, valve means to control the supply of pressure fluid to the power mechanism for shift actions, a device for controlling the supply of fuel to the engine, a clutch for engaging the change speed gearing with and disengaging it from the engine, a clutch controlled valve governing the flow of pressure fluid to prevent shift action of the gearing by the power mechanism when the clutch is closed and until the clutch is opened, and means for simultaneously controlling the fuel supply device and the clutch.

29. A pneumatic gear shift mechanism for automobiles embodying gear shift cylinders and pistons for successive shift operations, and a single control device operated by the piston of one cylinder for successively supplying working fluid pressure to said cylinder and then to a succeeding cylinder for successive shift actions of the respective pistons therein.

30. A pneumatic gear shift mechanism for automobiles embodying gear shift cylinders and pistons for successive shift operations in which each piston has a movement from a neutralizing position to a gear shift position and a return movement back to neutralizing position, means movable by the piston of one cylinder when the piston therein is in shift position for supply of fluid pressure to said cylinder to effect return movement of said piston and then supplying fluid pressure to a succeeding cylinder for a working movement of the piston therein from neutralizing position to a shift position.

31. In a power operated change speed gearing for automobiles employing reverse, first, second and third speed gears and a pair of slider rods for respectively shifting the reverse and first speed gears and the second and third speed gears, a gear shift housing containing said gearing and having an opening through which the gearing is exposed, and a power unit for actuating the change speed gearing comprising a detachable cover or head to close said opening in the housing, power mechanism for operating the speed change gearing and including a primary cylinder, a piston operating therein, a secondary cylinder, a piston operating therein, a speed controlled valve, and fluid supply and exhaust connections between said cylinders and valve, all carried by and applicable and removable with said cover or head as a unitary structure, motion transmitting connections carried by the head for coupling the respective piston rods to the respective slider rods when said unitary structure is applied to the housing, and speed controlled means for operatively connecting the speed controlled valve with a driven part at the driven side of the transmission when said unitary structure is applied to the housing.

32. In a power operated change speed gearing for automobiles, the combination of a gear shift housing, a change speed gearing having sets of unitarily shiftable gear elements disposed therein, said housing having an opening through which the gearing is exposed, a detachable cover or head to close said opening in the housing, fluid pressure power cylinders and pistons carried by and applicable and removable with the cover or head, and motion transmitting connections for coupling and uncoupling the sets of gear elements and pistons when the cover or head is applied and removed said connections comprising slider rods for shifting the gear elements and pivotally mounted levers coupling the pistons to said rods.

33. In a power operated change speed gearing for automobiles, the combination of a gear shift housing, a change speed gearing disposed therein, said housing having an opening through which the gearing is exposed, a detachable cover or head to close said opening in the housing, power cylinders and pistons for operating the change speed gearing carried by and applicable and removable with the cover or head, slidable shifter rods on the housing for shifting the gear elements, and pivotally mounted shifter levers on the head coupled to the pistons and having fork arms engageable with the rods when the head is applied to the housing for transmitting motion from the pistons of power cylinders to the rods.

34. In a gear shift mechanism for automobiles having a fluid pressure producing source of power, the combination of a gear shift mechanism having pneumatically operated power means for shifitng the gears for change speed actions, means controlling the application of power to the power means for effecting different speed changes, and a gear shift lever for shifting the gearing when the same is inoperable by the pneumatic means, said power means including at least a cylinder and a piston and means for connecting the cylinder with the atmosphere on each side of the piston to prevent air lock of the piston when the gearing is shifted by the gear shift lever.

35. A gear shift mechanism for auto vehicles having a variable speed gearing, means for shifting said gearing, a power operated clutch actuating device independent of the gear shifting means, a manually operable clutch actuating device, and a device operable on actuation of either of said clutch actuating devices to control the supply of fuel to the vehicle engine.

36. A gear shift mechanism for auto vehicles having a source of vacuum, a self-closing clutch, a vacuum operated clutch opening device, a valve normally held closed so as to cut off communication between said device and said source, whereby said device is normally maintained in an inactive state to adapt the clutch to be normally held closed by its closing means, a valve controlling the supply of fuel to the vehicle engine, and means for operating said valves to effect an opening movement of the clutch and a reduction of fuel supply to the engine, said means including a controlling element having a normally retracted position in which the first-named valve is closed and being movable on a working action from such position for actuating said means to open the first-named valve to connect the clutch opening device with the vacuum source for a clutch opening movement and to simultaneously close the second-named valve to reduce the supply of fuel to the engine.

37. A gear shifting device for automotive vehicles having a vacuum producing source of power, a clutch, change speed gearing through which the vehicle is driven including in combination vacuum operated means for changing gears, vacuum operated means for disengaging said clutch, speed controlled means for controlling said first means, a valve for controlling said second means, and means preventing engagement of said clutch while the gears are being changed from one speed to another.

38. A gear shifting device for automotive vehicles having an internal combustion engine, change speed gearing for transmitting power from said engine to drive the vehicle and including in combination vacuum operated means for shifting said gearing including a manually-operable reversing valve and means for rendering said valve inoperative for a reversing action when the vehicle is moving forward.

39. A gear shifting device for automotive vehicles having an internal combustion engine, change speed gearing for transmitting power from said engine to drive the vehicle and including in combination vacuum operated means for shifting said gearing including pistons for shifting said gearing to different forward speeds and reverse, speed controlled means for controlling movement of said pistons, a reversing valve, and means rendering said reversing valve inoperative for a reversing action when the vehicle is moving forward.

40. Gear shifting means for auto vehicles comprising a pneumatically operated shift mechanism, means controlling the flow of fluid pressure thereto for different gear shift changes, a clutch, a pneumatic clutch disengaging device, means for controlling said device for a clutch disengaging movement and preventing engagement of the clutch while the gears are being shifted, and a manually operable gear shift device for shifting the gears when the pneumatic controlling means is not in action, the shift mechanism having means affording relief from air lock of the operating parts thereof when shifted by said manually operable shift device.

41. In a gear shift for automotive vehicles having a fluid pressure producing source of power, the combination of a pneumatically operated gear shift mechanism, a speed responsive valve controlling the application of pneumatic power thereto for automatic gear shift changes, a valve controlling the application of power to the gear shift mechanism for manually selective gear shift changes, a clutch for connecting the vehicle engine with and disconnecting it from the gearing, means for operating the clutch, and means for preventing engagement of the clutch while the gears are being shifted.

42. In a gear shift for automotive vehicles having a fluid pressure producing source of power, the combination of a pneumatically operated gear shift mechanism embodying a shifter rod for reverse and first speed shifts, a shifter rod for second and third speed shifts, a primary motor acting on the first-named rod to effect reverse and first speed shifts and a secondary motor acting on the second-named rod for effecting second and third speed shifts, valve means controlling the application of pneumatic power to said motors for automatic and manually selective gear shift changes, a valve coacting with said valve means and operated by the primary motor for neutralizing said motor when in first speed position and controlling the flow of fluid pressure to the secondary motor for a second speed shift action thereof, a clutch for connecting the vehicle engine with and disconnecting it from the gearing, means for disengaging the clutch, and means for preventing shifting of the gears when the clutch is engaged and preventing engagement of the clutch after being disengaged while the gears are shifting.

43. A fluid pressure operated gear shift mechanism for automotive vehicles having a fluid pressure producing source of power, a change speed gearing, fluid pressure operated power devices for shifting the gearing, manually operable means controlling the flow of fluid pressure thereto for selective shift actions, a speed responsive means controlling the flow of fluid pressure thereto for automatic shift actions dependent upon the speed of the vehicle, a clutch, a clutch control device, and means controlled by the clutch control device for disengaging the clutch, preventing engagement of the clutch while the gears are shifting and preventing shifting of the gears when the clutch is engaged.

44. In a fluid pressure operated gear shift mechanism for automotive vehicles, the combination of a source of fluid pressure power production including the vehicle engine, a fluid pressure controlled transmission, a pair of valves, one of said valves being adapted for being manually shifted to control the supply of power to place the transmission gears into neutral, into low and into reverse driving position when shifted manually, the other of said valves being adapted for being automatically shifted by a mechanical governing device to control the supply of power for other automatic gear shift actions, and means for automatically throttling the engine when the gears are automatically shifted.

45. In an apparatus of the character described, and in combination with the transmission and engine of an automotive vehicle, manually settable controlling means for shifting the gears of the transmission into a neutral and into a reverse driving position, and automatic means for making the other essential shifts of the transmission gears, said automatic means comprising a valve separate from and movable independently of said manually settable means, mechanical governing means controlled by the speed of the vehicle for operating said valve, and means for throttling the engine during the automatic shifting of the gears.

46. A gear shifting device for automotive vehicles having a vacuum producing source of power, a clutch, change speed gearing through which the vehicle is driven including in combination vacuum operated means for changing gears, vacuum operated means for disengaging said clutch and means preventing engagement of said clutch while the gears are being changed from one speed to another.

47. A gear shifting device for automotive vehicles having a vacuum producing source of power, a clutch, change speed gearing through which the vehicle is driven including in combination vacuum operated means for disengaging the clutch, means for changing gears and means preventing engagement of said clutch while the gears are being changed from one speed to another.

48. In an automobile gear shift mechanism, and in combination with transmission gearing, a cylinder and piston therein, connected to the gearing for gear shifting actions, manually operable means for operating said gearing for gear shift actions, a suction line and an air line, and selectively operable valve means for connecting the suction and air lines to opposite sides of the piston for the power operation of the piston for gear shifting actions, said selectively operable valve means including a valve for connecting one side of the piston with the atmosphere through the air line in the use of said manually operable means.

49. In an automobile gear shift mechanism, and in combination with transmission gearing, suction operated cylinder and piston means for the power operation of said gearing for gear shift actions, manually operable means for operating said gearing for gear shift actions, and a plurality of valve means for selectively applying suction to one side or the other of the piston for gear shifting actions and including a valve for connecting one side of the piston with the atmosphere in the use of said manually operable means.

50. In an automotive gear shift mechanism, and in combination with transmission gearing, pneumatic power means for operating the gearing including a cylinder, a suction-operated piston movable therein and connected to the gearing for gear shifting actions by connections including a piston rod, manual means for shifting the gearing and moving the piston and rod, and valve means controlling the application of suction and atmospheric air to the piston including relatively movable parts one of which is carried by the piston rod and moved by the piston to control the application of suction to one side of the piston and of air to the other side of the piston, said relatively movable parts being moved to valve closing position by continued movement of the piston by suction.

51. In an automotive gear shift mechanism, and in combination with transmission gearing, a cylinder, a suction-operated piston movable therein and connected to the gearing for gear shifting action by connections including a piston rod, manual means for shifting the gearing and moving the piston and rod, and valve means controlling the application of suction to the piston including relatively movable parts one of which is carried by the piston rod and is moved by the piston and controlling the application of suction to one side of the piston and of air to the other side of the piston.

52. In an automobile gear shift mechanism, and in combination with transmission gearing, suction operated cylinder and piston means for the power operation of the gearing for gear shift actions, manually operable means for operating said gearing for gear shift actions including a control member and a gear shift lever connected therewith, and valve means for selectively applying suction to one side or the other of the piston means for gear shifting actions and for connecting the suction operated means with the atmosphere in the use of said manually operable means.

53. In an automobile gear shift mechanism, and in combination with transmission gearing, suction operated cylinder and piston means for the power operation of said gearing for gear shift actions, and a plurality of valve means for selectively applying suction to one side or the other of the piston for gear shifting actions and including a valve operated by the piston for connecting the cylinder with the atmosphere in the use of said manually operable means.

ANTHONY C. VELO.